UNITED STATES PATENT OFFICE 2,556,048

COPOLYMERS OF VINYLIDENE CHLORIDE AND ALIPHATIC EPOXIDES

George William Stanton and Charles Everett Lowry, Midland, Mich., assignors to The Dow Chemical Company, Midland, Mich., a corporation of Delaware No Drawing. Application May 2, 1947, Serial No. 745,640

4 Claims. (Cl. 260—87.7)

This invention relates to new and useful copolymers of vinylidene chloride and certain aliphatic hydrocarbon epoxides and their substitution products, and to the method whereby the new copolymers may be produced.

The polymer of vinylidene chloride is known to be submicroscopically crystalline, to be inert to most solvents and many chemicals, and to have a softening temperature so near its thermal decomposition point as to require modification before it can be fabricated successfully. No plasticizer is known which can be used in amounts of 2 to 5 per cent in the polymer of vinylidene chloride to reduce the molding temperature significantly below about 180° C., and larger amounts of most plasticizers tend to exude from this polymer. It has been the practice to prepare copolymers of vinylidene chloride with compounds containing a single ethylenic double bond, in order to produce polymer products with softening points considerably below 180° C. and considerably below the respective decomposition temperatures of the copolymers. It has been found that, the greater the change effected in the softening temperature, the greater is the variation of other properties from those of the polymer of vinylidene chloride alone. Sometimes there is a complete loss of crystallinity and the advantages attendant upon a crystalline polymer. In other cases the copolymer is crystalline but has much less resistance to the action of solvents than has the polymer of vinylidene chloride alone.

It is an object of the present invention to provide a copolymer of vinylidene chloride which will have a much lower softening point than the polymer of vinylidene chloride alone, and which otherwise resembles that sole polymer in general solvent resistance and crystalline characteristics. A related object is to provide a polymer resembling that of vinylidene chloride, which may be molded readily without decomposition. Another object is to provide a method whereby such a copolymer may be made.

We have now found that new and extremely interesting copolymers may be produced by polymerizing together in an aqueous medium the monomer of vinylidene chloride and an aliphatic compound containing from 2 to 8 carbon atoms, inclusive, and having the general formula

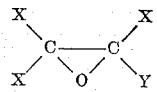

wherein each X is a member of the group of hydrogen and alkyl radicals and Y is a member of the group of hydrogen, alkyl, monochloroalkyl, monobromoalkyl and alkenyl radicals. Examples of such compounds useful in the present invention are: ethylene oxide; propylene oxide; epichlorhydrin, epibromhydrin; vinyl ethylene oxide; 1,2-epoxy butane; 2,3-epoxy butane; 1-chloro-2,3-epoxy butane; 1,2-epoxy-2-methyl butane; 2-methyl-2,3-epoxy butane; 2,3-dimethyl-2,3-epoxy butane; 2,3-dimethyl - 1,2 - epoxy hexane; 1,2-epoxy octane, and the like. The invention will be described in greater detail hereinafter.

We are aware that ethylene oxide and its homologues have been employed before in the polymerization of vinyl compounds and of halogen-containing monomers. Thus, in French Patent 712,303 and British Patent 384,639, a process is described for controlling the polymerization of vinyl compounds in which a small amount of acid, of the order of 1 per cent or less, is found advantageous, and an amount of ethylene oxide is added to keep the acid in this range by reaction with any excess acid formed during the polymerization. The amount of ethylene oxide is chosen to be sufficient to compensate for additional acid formed but insufficient to nullify the effect of the desired amount of acid. The polymerization is carried out in a non-aqueous medium, such as a solution in toluene, at temperatures from 100° to 150° C. Similarly, British Patent 572,767 disclosed polymerization of vinylidene chloride and other halogen-containing monomers in the presence of ethylene oxide, and teaches that the presence of water inhibits polymerization. The amount of ethylene oxide is at least sufficient to react with hydrogen chloride liberated during polymerization. The stated result is an increase in the softening point of the polymer.

In contrast with prior disclosed uses of alkylene oxides in polymerizations, the process of the present invention is carried out in an aqueous medium, using an emulsifying agent and a polymerization catalyst, with the mixture of vinylidene chloride monomer and one of the specified type of epoxides constituting the disperse phase. The polymerization is carried out at moderate temperatures, usually from 35° to 60° C., and is complete in 8 to 10 hours or less. The resulting latex is diluted with water and treated with a saline coagulant to precipitate the finely divided polymeric product which is then washed with water until the washings are free from emulsifier, and is finally dried. The polymeric product is in all cases capable of being molded readily at temperatures of 135° C. or lower, and molded articles made therefrom are clear and show no signs of thermal decomposition. Analysis of the washed and dried polymeric product shows it to contain a significant amount of the aliphatic epoxide copolymerized with the vinylidene chloride. Treatment of the copolymer with extractive solvents in which vinylidene chloride is insoluble does not change the composition, and it is evident from this fact in all cases, and from the results of the water-washing following polymerization when a water-soluble epoxide has been used, that the epoxide is not present merely as a contaminant or mechanical modifier, but is chemically bound into the polymeric molecule. The high solubility of ethylene oxide, ethylene glycols, and polyethylene oxide in water is well known.

There is evidence that, during the interpolymerization reaction, the epoxide polymerizes somewhat more rapidly than, but concurrently with, the vinylidene chloride, and that, when the polymerization has been carried substantially to completion, a large proportion of the epoxide originally present is permanently bound to the vinylidene chloride. When as little as 1.5 per cent of epoxide is present in copolymeric form with as much as 98.5 per cent of vinylidene chloride, the product can be molded easily at 135° C. Unmodified vinylidene chloride polymer can only be molded at temperatures above 180° C., and no amount or kind of "permanent" plasticizer is known which will permit it to be molded at temperatures of 135° C. or lower. Polymer product removed during the early stages of the reaction may contain as little as 50 per cent of vinylidene chloride, copolymerized with up to an equal weight of the hydrocarbon epoxide, and such a product is also found not to be affected in composition by washing with water or with extractive solvents or by heating to temperatures at which the unmodified epoxides are very volatile.

The following examples illustrate the method of making the new copolymers and describe the properties of some of them.

EXAMPLE 1

A freshly prepared solution of 1.5 per cent by weight of a purified grade of sodium lauryl sulfate in distilled water was charged into a polymerization vessel and was frozen. There was then added the mixture of monomers of vinylidene chloride and propylene oxide, as shown in the following Table I, in an amount weighing half the weight of water, together with 0.25 per cent, based on the weight of monomers, of potassium persulfate. The vessel was sealed, heated to 55° C., and the contents were maintained at that temperature, with agitation, for the indicated length of time. The resulting latex was removed from the polymerization vessel, diluted with 10 volumes of water, and coagulated by the addition of an aqueous solution of magnesium chloride. The resultant slurry was heated to 60° C., while stirring, and was then cooled and filtered, to remove the electrolyte solution from the polymeric product, which was washed repeatedly with water until the washings were free from any dissolved emulsifier. The polymer product was dried in a forced air oven at 70° C. for 16 hours, and was then analyzed. The results appear in Table I.

Table I

| Run No. | Monomers, Per Cent | | Time, Hours | Per Cent of Monomer Converted to Polymer | Analysis of Polymer | |
|---|---|---|---|---|---|---|
| | Vinylidene Chloride | Propylene Oxide | | | Vinylidene Chloride | Propylene Oxide |
| 1 | 90 | 10 | 2 | 16.5 | 83.1 | 16.9 |
| 2 | 90 | 10 | 3 | 37 | 93.2 | 6.8 |
| 3 | 90 | 10 | 3 | 40.3 | 93.0 | 7.0 |
| 4 | 90 | 10 | 3.5 | 63.6 | 94.2 | 5.8 |
| 5 | 90 | 10 | 4 | 78.9 | 95.4 | 4.6 |
| 6 | 90 | 10 | 6 | 88.7 | 96.1 | 3.9 |
| 7 | 90 | 10 | 8 | 89.0 | 96.3 | 3.7 |
| 8 | 90 | 10 | 16 | 90.1 | 96.8 | 3.2 |
| 9 | 75 | 25 | 24 | 76.9 | 95.9 | 4.1 |
| 10 | 50 | 50 | 24 | 52.0 | 95.8 | 4.2 |
| 11 | 25 | 75 | 24 | 15.4 | 87.6 | 12.4 |
| 12 | 50 | 50 | 32 | 49.5 | 98.5 | 1.5 |
| 13 | 50 | 50 | 4 | 35.9 | 92.6 | 7.4 |

It is observed, from Table I, that the greater the amount of propylene oxide in the monomer mixture, the lower is the per cent conversion to polymer in a given length of time. Similarly, with a fixed ratio of vinylidene chloride to propylene oxide in the monomer mixture, the longer the mixture is kept at a polymerization temperature, the lower is the amount of propylene oxide relative to vinylidene chloride in the copolymer. It was found, further, that when at least 30 per cent of the mixture of monomers had been converted to polymeric material, the product contained less than 10 per cent of copolymerized propylene oxide, regardless of the ratio of the original monomers. All of the copolymers obtained and reported in Table I, including the one containing only 1.5 per cent of copolymerized propylene oxide, could be molded at temperatures of 135° C. or lower, and the ones containing some 7, 12 and 16 per cent of copolymerized propylene oxide could be molded to form clear products at temperatures near 100° C.

EXAMPLE 2

In an identical manner, and with the same ratios of disperse to continuous phases (1:2) and of catalyst and emulsifier to the respective phases as reported in the preceding example, several mixtures of 90 per cent by weight of vinylidene chloride and 10 per cent of ethylene oxide were copolymerized in aqueous emulsion at 55° C. The results appear in Table II.

Table II

| Run No. | Time, Hours | Per Cent Conversion to Polymer | Analysis of Polymer | | |
|---|---|---|---|---|---|
| | | | Vinylidene Chloride | Ethylene Oxide | Specific Viscosity |
| 14 | 1 | 6.8 | 66.0 | 34.0 | .248 |
| 15 | 1.5 | 27.3 | 89.8 | 10.2 | |
| 16 | 2 | 53.3 | 94.3 | 5.7 | .459 |
| 17 | 2.5 | 56.5 | 92.8 | 7.2 | .409 |
| 18 | 3 | 84.9 | 96.6 | 3.4 | .379 |
| 19 | 4 | 88.1 | 96.8 | 3.2 | |
| 20 | 6 | 90.3 | 96.7 | 3.3 | .380 |
| 21 | 8 | 90.1 | 97.1 | 2.9 | |

NOTE: Specific viscosity was measured at 100° C. on a solution of 1 gram of the copolymer in 100 grams of isophorone.

The same conclusions can be reached from the foregoing table as were drawn with respect to the copolymers reported in Table I. All of the vinylidene chloride-ethylene oxide copolymers reported above could be molded to form clear molded articles at temperatures of 135° C. or lower.

EXAMPLE 3

In the same manner as reported in the preceding examples, and using the constant ratio of monomers employed in Example 2, a series of copolymers was prepared from vinylidene chloride and butadiene monoxide (vinyl ethylene oxide). The results appear in Table III, below.

Table III

| Run No. | Time, Hours | Per Cent Conversion to Polymer | Analysis of Polymer | |
|---|---|---|---|---|
| | | | Vinylidene Chloride | Butadiene Monoxide |
| 22 | 0.5 | 1.5 | 88.7 | 11.3 |
| 23 | 1.5 | 40.1 | 95.6 | 4.4 |
| 24 | 2 | 60.0 | 96.0 | 4.0 |
| 25 | 2.5 | 74.1 | 94.8 | 5.2 |
| 26 | 4 | 89.7 | 94.9 | 5.1 |
| 27 | 6 | 82.3 | 95.9 | 4.1 |
| 28 | 8 | 88.8 | 94.8 | 5.2 |

Here again, the polymerization, though slow in getting started, was practically complete in 4 hours. The copolymer obtained after about 1.5 hours remained practically unchanged in composition during the rest of the reaction period. The copolymers of vinylidene chloride and butadiene monoxide reported in the foregoing table could all be molded to form clear articles at a temperature of 135° C.

When the polymer of vinylidene chloride alone was prepared in aqueous emulsion using the emulsifier, catalyst, and ratio of phases employed in the foregoing Examples 1 to 3, at a temperature of 55° C., and the reaction was continued until 80–95 per cent of the monomer had been converted to polymer, the product could be molded only with difficulty, and only at temperatures of about 180° C. and higher, but gave signs of darkening and decomposition at 170° C. The molded products were yellow to brown, and were opaque.

In addition to the compounds specifically employed in producing the copolymers of the illustrative examples, other aliphatic epoxides containing up to 8 carbon atoms and conforming to the general formula set forth above, may be employed to produce analogous copolymers with vinylidene chloride. All of the copolymers obtained have been highly crystalline when the amount of epoxide in the product is less than 10 per cent.

The invention has been illustrated by examples in which sodium lauryl sulfate was employed as the emulsifier and potassium persulfate was employed as the catalyst. It is to be understood that any of numerous other emulsifying agents may be employed, including the commercially available salts of long chain alkyl sulfuric acids and those of aromatic sulfonic acids. Other catalysts which may be used include ammonium and sodium persulfate, hydrogen peroxide, lauroyl peroxide, benzoyl peroxide, and the like. The ratio of continuous to disperse phase in the emulsion may be varied widely, as desired, and need not be the specific ratios disclosed in the examples, so long as the polymerizing system is a free-flowing liquid.

The new copolymers are useful where the resistance of vinylidene chloride polymer to chemicals and to solvents is desired, but where a greater ease of fabrication at moderate temperatures, and without decomposition, is required.

We claim:

1. The method which comprises dispersing in an aqueous medium a polymerizable mixture consisting of from 25 to 90 per cent of monomeric vinylidene chloride, correspondingly from 75 to 10 percent of the monomer of an aliphatic epoxy compound selected from the group consisting of ethylene oxide, propylene oxide and butadiene monoxide; and a polymerization catalyst; subjecting the mixture to a polymerization temperature of from 35° to 60° C. while maintaining the polymerizing material in dispersion until the resulting copolymer contains from 66 to 98.5 per cent of vinylidene chloride and correspondingly from 34 to 1.5 per cent of the aliphatic epoxy compound copolymerized therein; and separating from the aqueous medium the said copolymer which is capable of being molded at a temperature of 135° C.

2. The method which comprises dispersing in an aqueous medium a polymerizable mixture consisting of about 90 per cent of monomeric vinylidene chloride, correspondingly about 10 per cent of monomeric ethylene oxide, and a polymerization catalyst; subjecting the mixture to a polymerization temperature of from 35° to 60° C. while maintaining the polymerizing material in dispersion, until the resulting copolymer contains from 66 to 97.1 per cent vinylidene chloride and correspondingly from 34 to 2.9 per cent ethylene oxide copolymerized therein; and separating from the aqueous medium the said copolymer which is capable of being molded at a temperature of 135° C.

3. The method which comprises dispersing in an aqueous medium a polymerizable mixture consisting of from 25 to 90 per cent of monomeric vinylidene chloride, correspondingly from 75 to 10 per cent of monomeric propylene oxide, and a polymerization catalyst; subjecting the mixture to a polymerization temperature of from 35° to 60° C. while maintaining the polymerizing material in dispersion, until the resulting copolymer contains from 83.1 to 98.5 per cent of vinylidene chloride and correspondingly from 16.9 to 1.5 per cent of propylene oxide copolymerized therein; and separating from the aqueous medium the said copolymer which is capable of being molded at a temperature of 135° C.

4. The method which comprises dispersing in an aqueous medium a polymerizable mixture consisting of about 90 per cent of monomeric vinylidene chloride, correspondingly about 10 per cent of monomeric butadiene monoxide, and a polymerization catalyst; subjecting the mixture to a polymerization temperature of from 35° to 60° C. while maintaining the polymerizing material in dispersion, until the resulting copolymer contains from 88.7 to 96 per cent vinylidene chloride and correspondingly from 11.3 to 4 per cent butadiene monoxide copolymerized therein; and separating from the aqueous medium the said copolymer which is capable of being molded at a temperature of 135° C.

GEORGE WILLIAM STANTON.
CHARLES EVERETT LOWRY.

REFERENCES CITED

The following references are of record in the file of this patent:

UNITED STATES PATENTS

| Number | Name | Date |
|---|---|---|
| 2,160,943 | Britton | June 6, 1939 |
| 2,176,091 | McClurg | Oct. 17, 1939 |
| 2,333,634 | Britton | Nov. 9, 1943 |
| 2,380,009 | Arnold | July 10, 1945 |
| 2,470,324 | Staudinger | May 17, 1949 |

FOREIGN PATENTS

| Number | Country | Date |
|---|---|---|
| 572,767 | Great Britain | Oct. 23, 1945 |